March 6, 1956 C. L. EDWARDS 2,737,104
SOD TRIMMER
Filed Nov. 10, 1952
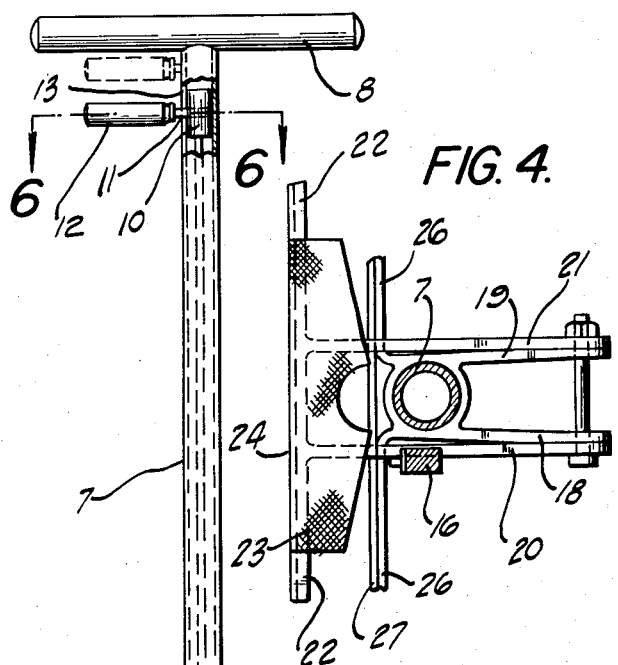
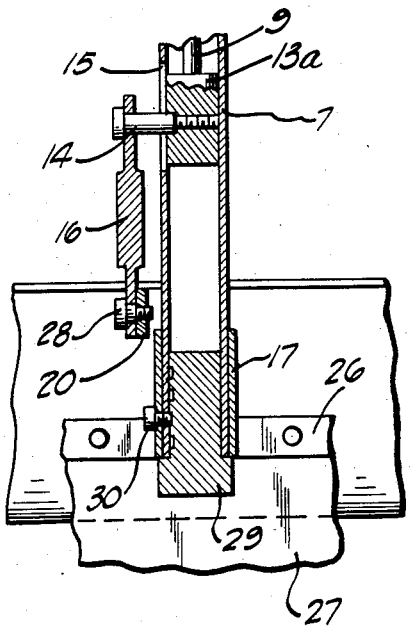
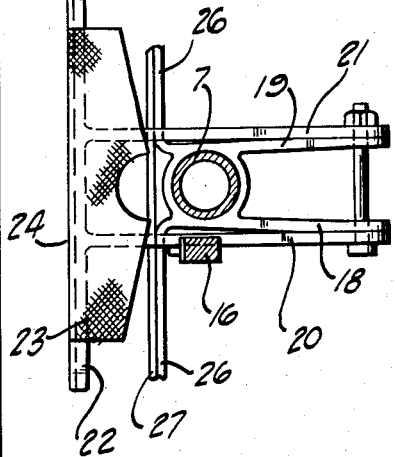
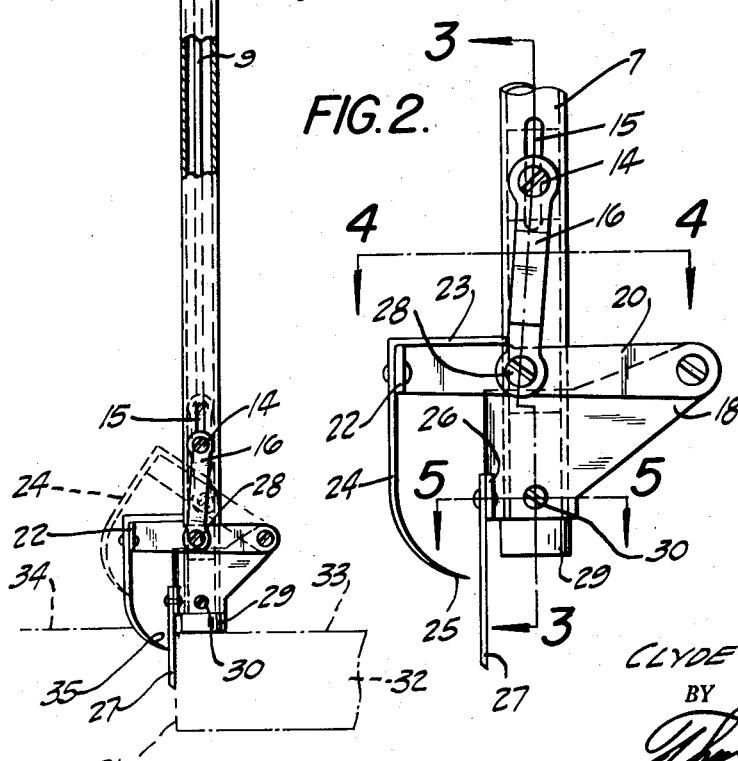
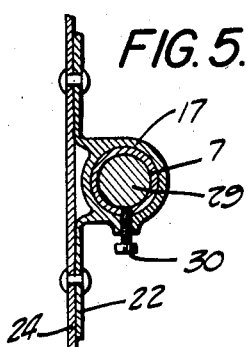
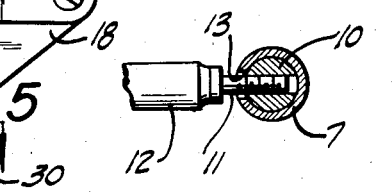
INVENTOR.
CLYDE L. EDWARDS
BY
Thos. S. Donnelly
ATTORNEY.

United States Patent Office 2,737,104
Patented Mar. 6, 1956

2,737,104

SOD TRIMMER

Clyde L. Edwards, Detroit, Mich.

Application November 10, 1952, Serial No. 319,742

4 Claims. (Cl. 97—227)

My invention relates to a new and useful improvement in a sod trimmer adapted for use in trimming sod along the edges of sidewalks, side drives and the like.

It is an object of the present invention to provide a sod trimmer which will be light, durable, economically manufactured, easily and quickly operated and highly efficient in use.

Another object of the invention is the provision of a sod trimmer having a cutting blade so arranged and constructed that when the blade has been moved to cutting position to cut off a piece of sod the severed piece of sod will be retained by the blade until manually released.

Another object of the invention is the provision of a sod trimmer so arranged and constructed that it may be easily and quickly adjusted to cutting at various depths.

Another object of the invention is the provision of a structure whereby, when the blade is rocked downwardly to its maximum of cutting movement, further rocking will be effected so that the blade may not be deformed.

Other objects will appear hereinafter.

It is recognized that various modifications and changes may be made in the detail of structure illustrated without departing from the invention and it is intended that the present disclosure shall be considered but the preferred embodiment of the invention.

Forming a part of this specification are drawings, in which,

Fig. 1 is an elevational view of the invention with parts broken away and parts shown in section, Fig. 2 is a slightly enlarged elevational view of one end of the invention, Fig. 3 is a sectional view taken on line 3—3 of Fig. 2, Fig. 4 is a sectional view taken on line 4—4 of Fig. 2, Fig. 5 is a sectional view taken on line 5—5 of Fig. 2, and Fig. 6 is a fragmentary sectional view taken on line 6—6 of Fig. 1.

As shown in the drawings the invention comprises an elongated tube 7 to the upper end of which is attached a handle or hand grip 8. Slidable in the tube 7 is a rod 9 the upper end of which is connected to a weight 10 which is slidable in the tube 7 and to which is attached one end of a stud 11 projecting through the longitudinal slot 13 formed in the tube 7 and connected to the handle 12.

The lower end of the rod 9 is connected to a weight 13a which is slidably mounted in the tube 7. A stud 14 which projects through a longitudinal slot 15 in the tube 7 is connected to one end of a link 16.

Embracing the lower end of the tube 7 is a sleeve 17 projecting outwardly from which are the bracket arms 18 and 19. Pivoted at one of their ends to the ends of the bracket arms 18 and 19 is a pair of rocker arms 20 and 21. These rocker arms are secured at their opposite ends to an angle iron 22. Overlying this angle iron and secured thereto is a treadle blade 23 which is provided with a downwardly extended portion 24 having the inwardly turned lower edge 25. This portion 24 is as shown in Fig. 4 extended beyond the sides of the treadle blade 23.

Secured to the sleeve 17 and extending from opposite sides thereof is an angle iron 26 to which is secured the depending backing blade 27. The lower end of the link 16 is pivotally secured by the stud 28 to the rocker arm 20 intermediate the ends thereof.

Slidable into the lower end of the tube 7 is a gage block 29 which may be secured in various positions longitudinally of the tube 7 by means of the set screw 30.

In use the operator would pull upwardly on the handle 12 so as to rock the cutting blade 24 into the dotted line position shown in Fig. 1. The backing plate or blade 27 would then be thrust into the earth along the edge face 31 of the sidewalk 32 with the face of the gage block 29 resting upon the upper surface 33 of the sidewalk. The depth of thrust of the blade 27 will be dependent upon the adjusted position of the gage block 29 in the tube 7. The operator would then release the handle 12 and step upon the treadle 23 so as to force the cutting blade downwardly into full line position as shown in Fig. 1, the cutting blade passing through the face 34 of the sod and engaging the face of the backing blade 27 so as to sever a part of the sod and form a shallow trench 35. The operator then may raise the structure by means of the handle 8 and the weight of the slidable weights 10 and 13 and the rod 9 would prevent the cutting blade from rocking upwardly from its cutting position so that the severed piece of sod may be carried away for proper disposal. It is not necessary in the operation of this sod cutter to press the handle 12 downwardly in order to retain the cut away piece of sod in position. In this downward movement as the blade 24 moves to its maximum cutting position the studs 14 and 11 will engage the lower ends of their respective slots and the link 16 will have moved slightly past center so that excessive pressing of the cutting edge 25 of the blade 24 against the backing blade 27 is thus prevented.

Experience has shown that a sod trimmer of this class is highly efficient in use and that edges of the sod may be easily and quickly trimmed making it possible for the operator to determine or vary the size of trench according to individual choice.

What I claim is:

1. In a sod trimmer of the class described comprising a cutting blade; a tube; rocker arms projecting outwardly from said cutting blade; bracket arms carried by said tube and pivotally connected at their ends to the ends of said rocker arms for rockably mounting said blade on said tube; a rod slidably mounted in said tube; a link connected at one of its ends to said rocker arms intermediate the ends thereof; a stud for connecting the opposite end of said link to said rod, said stud projecting through an elongated longitudinal slot formed in the tube and engageable with the lower end of said slot for limiting rocking movement of said blade in one direction.

2. In a sod trimmer of the class described comprising a cutting blade; a tube; rocker arms projecting outwardly from said cutting blade; bracket arms carried by said tube and pivotally connected at their ends to the ends of said rocker arms for rockably mounting said blade on said tube; a rod slidably mounted in said tube; a link connected at one of its ends to said rocker arms intermediate the ends thereof; a stud for connecting the opposite end of said link to said rod, said stud projecting through an elongated longitudinal slot formed in the tube and engageable with the lower end of said slot for limiting rocking movement of said blade in one direction; and a weight connected to said rod and slidable in said tube for normally resisting rocking movement of said cutting blade in one direction.

3. In a sod trimmer of the class described comprising a tubular member; a handle on the upper end of said tubular member; a rod positioned within said tubular member; a cutting blade rockably mounted on the lower end of said tubular member; a link connecting said rod to said cutting blade for effecting rocking movement of said cutting blade upon slidable movement of said rod in said tube, said rod being movable downwardly in said tube a pre-determined distance and said link preventing rocking movement of said blade in one direction after movement of said rod said pre-determined distance; and a weight carried by said rod in said tube for resisting upward slidable movement of said rod in said tube; a handle; and a stud on said handle projecting through an elongated slot in said tube and connected to said rod for effecting slidable movement of said rod longitudinally of said tube.

4. In a sod trimmer of the class described, a tubular member; a handle on the upper end of said tubular member; a bracket mounted on the lower end of the said member and projecting outwardly from one side thereof; a backing blade carried by said tubular member at the lower end thereof and projecting beyond the lower end thereof at the opposite side of said tubular member; a cutting blade; rocker arms pivotally connected at one of their ends to said bracket and projecting laterally outwardly beyond said backing blade for supporting said cutting blade, said cutting blade being turned inwardly toward said backing blade; a rod slideably mounted in said tube and extending the length thereof; a link connected at one of its ends to the lower end of said rod and at its other end to said rocker arms intermediate the ends thereof, for, upon sliding movement of said rod in said tubular member, rocking said arms for moving said cutting blade toward and away from said backing blade; and a handle connected to said rod and accessible exterior of said tubular member adjacent the upper end thereof for effecting a slideable movement of said rod in said tubular member for rocking said rockers upwardly and downwardly.

References Cited in the file of this patent

UNITED STATES PATENTS

| | | |
|---|---|---|
| 774,142 | Brick | Nov. 1, 1904 |
| 1,783,026 | Ober | Nov. 25, 1930 |
| 2,015,109 | Hays | Sept. 24, 1935 |
| 2,485,877 | Hamilton | Oct. 25, 1949 |
| 2,532,147 | Christiansen | Nov. 28, 1950 |